United States Patent

Nishimoto et al.

Patent Number: 5,271,474
Date of Patent: Dec. 21, 1993

[54] ELECTRIC POWER STEERING APPARATUS

[75] Inventors: Mitsuhiko Nishimoto, Yoshino; Hirofumi Matsuoka, Kyoto; Hidetoshi Tabuse, Wakayama, all of Japan

[73] Assignee: Koyo SeikoCo., Ltd., Osaka, Japan

[21] Appl. No.: 9,875

[22] Filed: Jan. 27, 1993

[30] Foreign Application Priority Data

Feb. 4, 1992 [JP] Japan .................................. 4-054263

[51] Int. Cl.⁵ .............................................. B62D 5/04
[52] U.S. Cl. .................................. 180/79.1; 364/424.05
[58] Field of Search ...................... 180/79.1, 141, 142, 180/140; 364/424.05

[56] References Cited

U.S. PATENT DOCUMENTS

| 4,621,327 | 11/1986 | Dolph et al. | 364/424.05 |
| 4,869,334 | 9/1989 | Marumoto et al. | 180/79.1 |
| 5,082,080 | 1/1992 | Kanazawa et al. | 180/79.1 |
| 5,202,830 | 4/1993 | Tsurumiya et al. | 364/424.05 |
| 5,226,499 | 7/1993 | Kanazawa et al. | 180/140 |

FOREIGN PATENT DOCUMENTS

WO88/00545  1/1988  PCT Int'l Appl. .
2241123A    8/1991  United Kingdom .

Primary Examiner—Margaret A. Focarino
Assistant Examiner—Kevin Hurley
Attorney, Agent, or Firm—Darby & Darby

[57] ABSTRACT

An electric power steering apparatus has a main CPU for performing a drive control for steering assistance over a steering assistance motor based on the detected steering torque and detected vehicle speed and a sub CPU for detecting abnormality in the main CPU by monitoring inputs and outputs to and from the main CPU, wherein the sub CPU is destined to detect abnormality in the main CPU only when the drive control for steering assistance is performed by the main CPU.

9 Claims, 4 Drawing Sheets

ELECTRIC POWER STEERING APPARATUS

BACKGROUND OF THE INVENTION

1. Field of the Invention

The present invention relates to an electric power steering apparatus for assisting the force required to turn the steering wheel of a vehicle.

2. Description of the Related Art

An electric power steering apparatus has been developed which uses a vehicle speed sensor to detect the traveling speed of the vehicle and a torque sensor to detect the steering torque applied at the steering wheel. In the electric power steering apparatus of this type, when the steering torque measured exceeds a predetermined dead zone, a steering assistance motor is driven by a driving current of the magnitude determined according to the detected steering torque and the detected vehicle speed, and the rotational force of the motor is used to provide power to assist the force required to steer the vehicle, thereby providing a comfortable steering feeling to the driver. The steering assistance is controlled based on the operation by a control unit. One such electric power steering apparatus employs a dual controller system consisting of a first and second control units to ensure the system safety against malfunctions, such as runaway, of the controller.

With the electric power steering apparatus with the dual controller system, the first control unit serves to control a motor for providing an assistance force to steer the steering wheel by carrying out an operation to find a driving current value for the motor based on the detected torque and the detected vehicle speed. Such a control by the first control unit for the steering assistance tends to be executed after the first control unit has effected a diagnosis such as a motor-lock detection, in which the motor is put in motion independent from any input of the detected torque and vehicle speed, for an initial diagnosis of the operation of the system at the start of the first control unit.

On the other hand, the second control unit acts to detect abnormality of the first control unit with procedure steps of performing the same operation as the first control unit, and comparing the result of the operation with that of the operation by the first control unit in order to monitor inputs and outputs to and from the first control unit. Such a detection of abnormality of the first control unit by the second control unit is started concurrently with the start of operation of the first control unit.

This electric power steering apparatus is arranged such that if any abnormality is detected by the second control unit in the first control unit, the second control unit will make a fail-safe control, i.e. by stopping the steering assistance motor in order to assure the safety of the system.

In the conventional electric power steering apparatus, however, there is a risk of the second control unit taking erroneously as the abnormality of the first control unit the rotation of the motor trially effected independent from the input as the stage of the initial diagnosis as executed by the first control unit, on the ground that the detection by the second control unit is started at the same time when the first control unit starts its operation.

SUMMARY OF THE INVENTION

A main object of the present invention is to provide an electric power steering apparatus provided with a dual controller system wherein any abnormality of a control unit to be monitored (first control unit) can be detected with certainty by a control unit operable as monitor (second control unit).

The electric power steering apparatus has a first control unit for performing a drive control for steering assistance over a steering assistance motor based on a detected steering torque and detected vehicle speed, a second control unit for detecting abnormality in the first control unit by monitoring inputs and outputs to and from the first control unit, detection means for detecting the state where the drive control is performed by the first control unit, and means for controlling the second control unit to detect abnormality in the first control unit only when the detection means detects that the drive control is performed. The detection means is operative to judge whether a clutch for transmitting a driving force of the steering assistance motor is in engagement or disengagement position, and to determine the first control unit performing the drive control for steering assistance if detected the clutch in engagement position.

The second control unit tends to detect abnormality in the first control unit only when the drive control for steering assistance is in action. Thus, when the first control unit conducts an initial diagnosis for the steering assistance motor by driving the motor independent from the inputs of the detected torque and detected vehicle speed by way of a drive control for the motor except for the drive control for steering assistance, the second control unit will never mistake for abnormal the operation of the first control unit.

The above and further objects and features of the invention will more fully be apparent from the following detailed description with the accompanying drawings.

DESCRIPTION OF THE PREFERRED EMBODIMENTS

Figure 1:
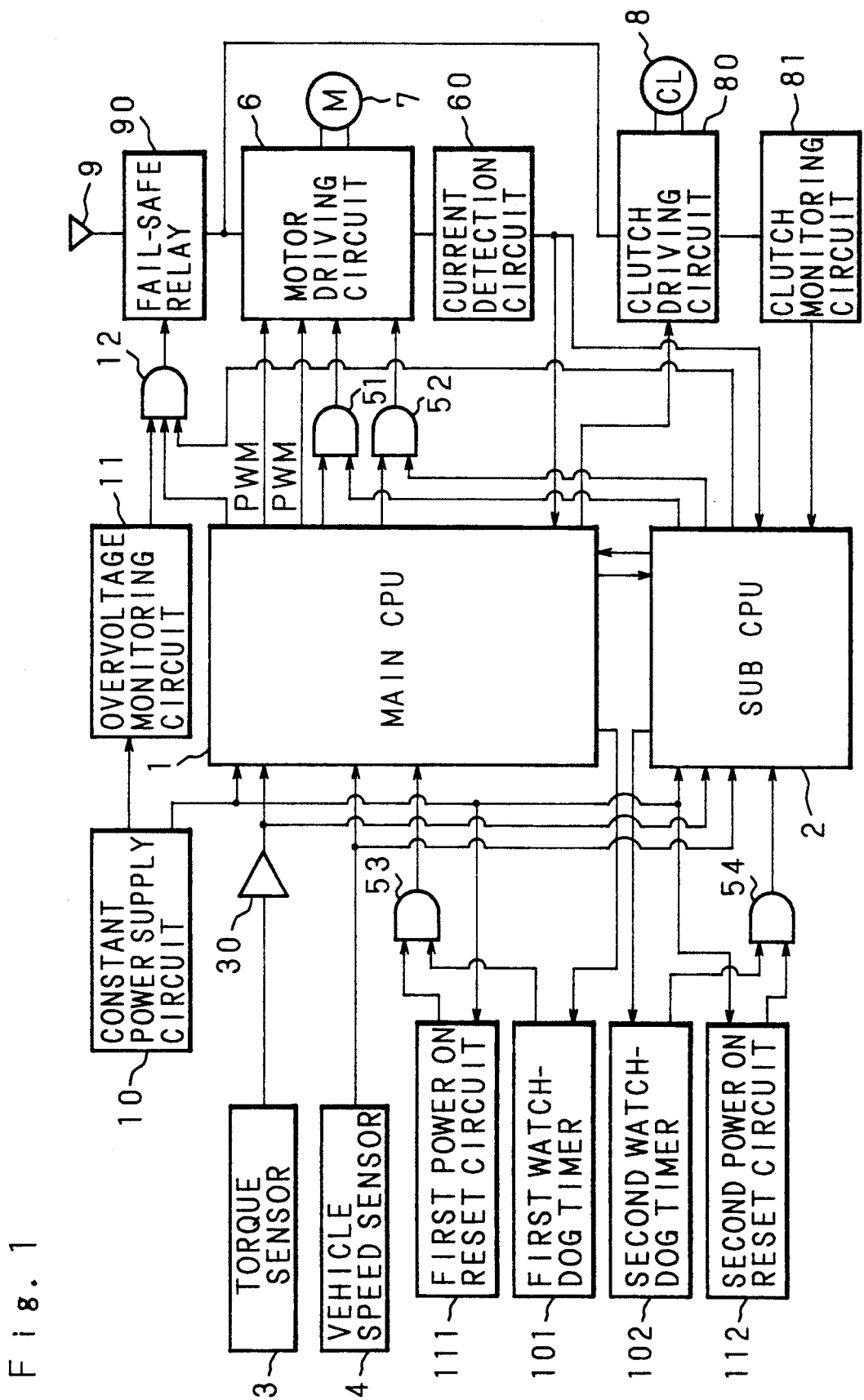
FIG. 1 is a block diagram showing the configuration of an electric power steering apparatus according to the present invention.

The present invention will be described in detail with reference to the drawings showing the embodiments thereof. FIG. 1 is a block diagram showing the configuration of the electric power steering apparatus in accordance with the present invention.

In the drawing, the numeral 1 designates a main CPU as a first control unit for controlling steering assistance, the operational state of the main CPU 1 is monitored by a sub CPU 2.

A constant power supply circuit 10 is a power source for the respective main CPU 1 and sub CPU 2. Except for the main CPU 1 and sub CPU 2, the constant power supply circuit 10 serves to apply its voltage to a first power on reset circuit 111 for subjecting the main CPU 1 to power on reset, a second power on reset circuit 112 for subjecting the sub CPU 2 to power on reset, and a overvoltage monitoring circuit 11 for monitoring whether an overvoltage has been impressed from the constant power supply circuit 10 to the main CPU 1 and sub CPU 2 respectively. If the voltage value of the constant power supply circuit 10 does not exceed a predetermined value, the overvoltage monitoring circuit 10 applies a high level logic signal to an AND gate 12 for 3 inputted relay actuation so as to actuate a fail-safe relay 90, while the circuit 10 applies a low level logic signal to the AND gate 12 when the voltage value of the constant power supply circuit 10 exceeds the predetermined value.

The main CPU 1 applies to the sub CPU 2 a watchdog pulse signal through which the sub CPU 2 monitors the basic operation of the main CPU 1, and a reset signal for resetting the sub CPU 2, while the sub CPU 2 applies to the main CPU 1 a watchdog pulse signal through which the main CPU 1 monitors the basic operation of the sub CPU 2 and a reset signal for resetting the main CPU 1. Furthermore, the main CPU 1 sends the watchdog pulse signal to a first watchdog timer 101 in addition to the sub CPU 2, and the sub CPU 2 sends the watchdog pulse signal to a second watchdog timer 102 in addition to the main CPU 1.

Additionally, a torque detection signal obtained by amplifying through an amplifier 30 a result of detection by a torque sensor 3 for detecting a steering torque of a steering wheel, and a vehicle speed detection signal by a vehicle speed sensor 4 for detecting the speed of a vehicle, are applied to the main CPU 1 and the sub CPU 2.

Based on the applied torque detection signal and vehicle speed detection signal, the main CPU 1 is operative to seek a driving current for driving a steering assistance motor 7 and the direction of rotation thereof according to a predetermined arithmetic operation, and then applies a PWM driving signal in response to the obtained driving current to a motor drive circuit 6. When the obtained rotational direction of the motor 7 is clockwise, the main CPU 1 applies a high logic signal to a first AND gate 51 which then supplies a clockwise rotation signal to the motor driving circuit 6 to drive the motor 7 in clockwise direction. On the other hand, when the obtained rotational direction of the motor 7 is counterclockwise, the main CPU 1 applies a low logic signal to a second AND gate 52 which then supplies a counterclockwise rotation signal to the motor driving circuit 6 to drive the motor 7 in counterclockwise direction.

The operation of the main CPU 1 involves applying a driving signal for urging a clutch 8 into engagement and disengagement modes to a clutch driving circuit 80 to drive the clutch 8 for effecting transmission of a driving force of the motor 7, monitoring abnormality in the basic operation of the sub CPU 2 which will be described afterwards, with reference to the watchdog pulse signal produced by the sub CPU 2, and applying a high signal to the AND gate 12 for relay actuation when power is delivered from the constant power supply circuit 10.

Additional operation of the main CPU 1 involves actuating the motor 7 independent from any inputs of the detected torque and detected vehicle speed, at the very start of the operation of the main CPU 1 for the initial diagnosis of the operation of the system of the electric power steering apparatus, with the clutch 8 retained in disengagement position, thereby making a motor lock detection, and then putting the clutch 8 in engagement position after the motor lock detection so that the drive control of the motor 7 may be performed as aforementioned.

The clutch driving circuit 80 is connected with a clutch monitoring circuit 81 for monitoring the operation of the clutch 8 by detecting a terminal voltage (or driving current of the clutch 8) of the clutch 81. The clutch monitoring circuit 81 is adapted to judge whether the clutch is in engagement or disengagement position based on a value of this terminal voltage (or driving current), and to provide the judgment result for the sub CPU 2.

If the judgment result given by the clutch monitoring circuit 81 represents that the clutch 8 is in engagement position, the sub CPU 2 determines a driving current for driving the motor 7 and the rotational direction thereof by the same arithmetic operation as in the main CPU 1 and the motor 7 based on the torque detection signal and the vehicle speed detection signal given as above described to monitor abnormality in the control operation of the main CPU 1 which will be described afterwards, as well as to monitor abnormalities of the main CPU 1 in its basic operation which will be described later on, with reference to the watchdog pulse signal produced by the main CPU 1, thereby to apply logic signals to the first and second AND gates 51, 52 respectively in accordance with such monitoring operations. Furthermore the sub CPU 2 applies a high signal to the AND gate 12 for relay actuation when power is delivered from the constant power supply circuit 10.

With logic signals from both the main CPU 1 and sub CPU 2 being in a high level, the first AND gate 51 applies a high clockwise signal to the motor driving circuit 6. With logic signals from both the main CPU 1 and sub CPU 2 being in a high level, the second AND gate 52 applies a high counterclockwise signal to the motor driving circuit 6.

The motor driving circuit 6 determines the rotational direction of the motor 7 based on the clockwise and counterclockwise signals so as to drive the motor 7 based on the PWM driving signal from the main CPU 1. If the logic signals from the first and second AND gates 51, 52 are low respectively, the motor driving circuit 6 prohibits the drive of the motor 7. The driving current of the motor 7 is detected by a current detection circuit 60, and the detection result is fed to the main CPU 1 and sub CPU 2.

The motor driving circuit 6 and clutch driving circuit 80 are supplied with power for their exciting purposes by a power source 9 via the fail-safe relay 90. An output signal from the AND gate 12 for relay actuation is delivered to the fail-safe relay 90. The output signal from the AND gate 12 for relay actuation becomes high when all the signals from the overvoltage monitoring circuit 11, main CPU 1 and sub CPU 2 have reached a high level, but becomes low otherwise. If an output signal of the AND gate 12 for relay actuation is on a high level, the fail-safe relay 90 is turned on to apply power to the motor driving circuit 6 and clutch driving circuit 80, while if the output signal of the AND gate for relay actuation 12 is on a low level, the fail-safe relay 90 is turned off to stop applying power to the motor driving circuit 6 and clutch driving circuit 80.

The first watchdog timer 101 is designed to measure the frequency of the watchdog pulse signal outputted from the main CPU 1 in a predetermined cycle, and then to make an comparison between the resultant measured value of frequency and a preset reference value. If these values are almost equal each other, an output signal of the first watchdog timer 101, which is a high signal is applied to a third AND gate 53. The second watchdog timer 102 is designed to measure the frequency of the watchdog pulse signal outputted from the sub CPU 2 in a predetermined cycle, and then to make an comparison between the measured value of frequency and a preset reference value. If these values are almost equal each other, an output signal of the second watchdog timer 102, which is a high level, is applied to a fourth AND gate 54.

The first power on reset circuit 111 is intended to prevent any operational abnormality which may arise at the start of the main CPU 1 by resetting the main CPU 1 in terms of its operation until the oscillator of the main CPU 1 starts a normal operation at the start of the main CPU 1. For a predetermined period of time after the voltage of the constant power supply circuit 10 has risen to a prescribed value, the first power on reset circuit 111 outputs a low signal, and the low signal turns high after such a predetermined period of time, and then is applied to the third AND gate 53. The second power on reset circuit 112 is intended to prevent any operational abnormality which may arise at the start of the sub CPU 2 by resetting the sub CPU 2 in terms of its operation until the oscillator of the sub CPU 2 starts a normal operation at the start of the sub CPU 2. For a predetermined period of time after the voltage of the constant power supply circuit 10 has risen to a prescribed value, the second power on reset circuit 112 outputs a low signal, and the low signal turns high after such a predetermined period of time, and then is applied to the fourth AND gate 54.

When the first watchdog timer 101 and the first power on reset circuit 111 generate high signals respectively, the third AND gate 53 produces a high signal, but a low signal otherwise. Such a signal is transmitted to the reset terminal of the main CPU 1. The main CPU 1 is reset for its operation if a low signal is fed to the reset terminal, namely when the main CPU 1 is put at the start state or when an abnormal watchdog pulse signal is outputted by the main CPU 1.

When the second watchdog timer 102 and the second power on reset circuit 112 generate high signals respectively, the fourth AND gate 54 produces a high signal, but a low signal otherwise. Such a signal is transmitted to the reset terminal of the sub CPU 2. The sub AND gate 2 is reset for its operation if a low signal is fed to the reset terminal, namely when the sub CPU 2 is put at the start state or when an abnormal watchdog pulse signal is outputted by the sub CPU 2.

Figure 2:
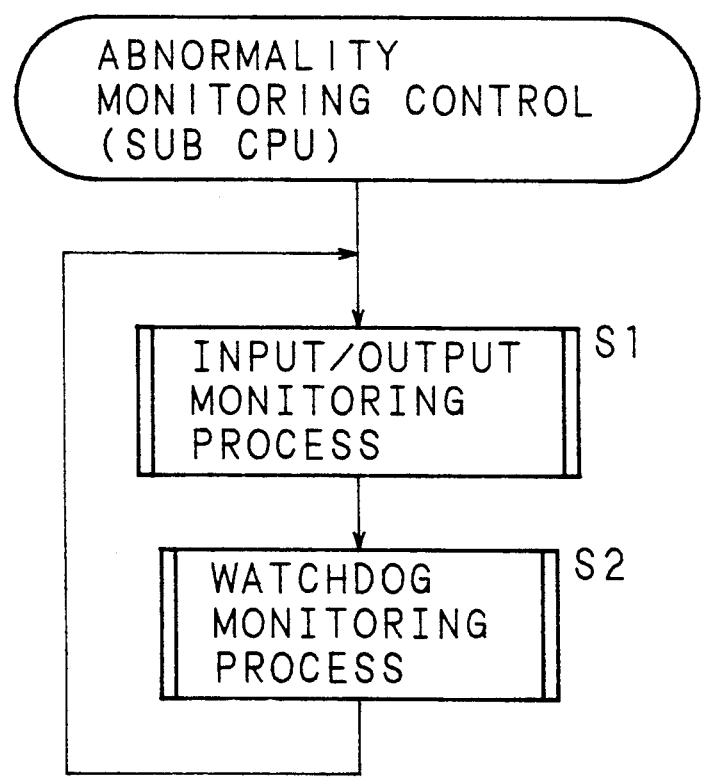
FIG. 2 is a flowchart showing a main routine of the abnormality monitoring control by the sub CPU (second control unit) on the main CPU (first control unit)

Next, the main CPU 1 and sub CPU 2 of the electric power steering apparatus will be described with reference to the respective abnormality monitoring procedures. FIG. 2 is a flowchart showing a main routine of the abnormality monitoring control of the main CPU 1 by the sub CPU 2.

The sub CPU 2 executes an input/output monitoring process subroutine (Step S1) and a watchdog monitoring process subroutine (Step S2) in sequence.

First, the description will be made of the input/output monitoring process subroutine (Step S1) in the sub CPU 2. The input/output monitoring process for the main CPU 1 by the sub CPU 2 involves performing the same arithmetic operation as in the steering assistance control by the main CPU 1, comparing this specific operation result and the operation result of a steering assistance control by the main CPU 1, and detecting abnormality in the main CPU 1 based on the comparison result. Parameters to be compared with each other consist of plural elements such as a driving current value of the motor 7 and rotational direction of the motor 7, but the input/output monitoring process will be explained with reference to the monitoring of the driving current value of the motor 7.

Figure 3:
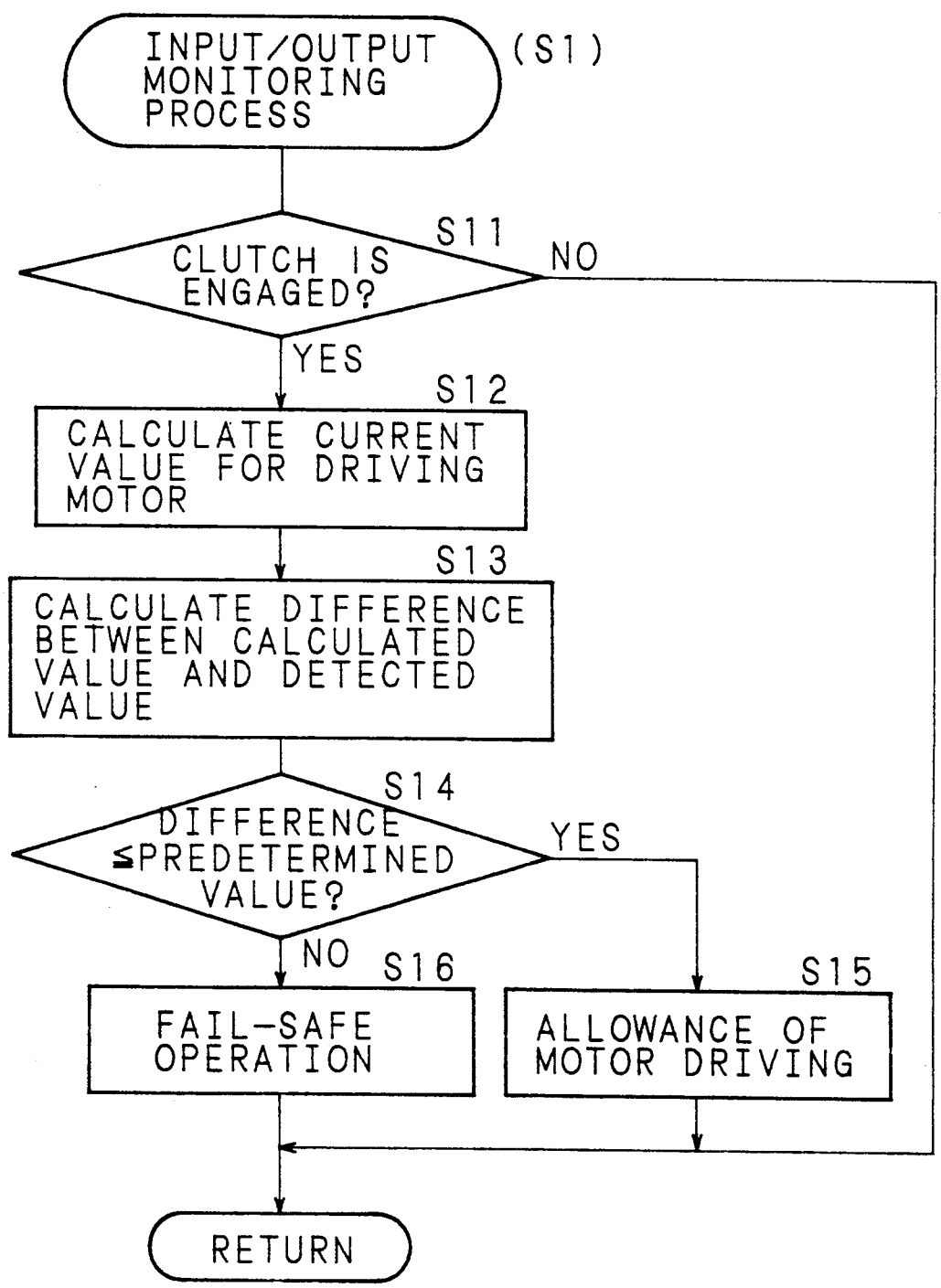
FIG. 3 is a flowchart showing a subroutine for an input/output monitoring process in the sub CPU.

FIG. 3 is a flowchart showing what has been processed in the input/output monitoring process subroutine (Step S1) by the sub CPU 2. Firstly, judgment is made based on informations of the clutch submitted by the clutch monitoring circuit 81 of whether or not the clutch is in engagement position (Step S11), and processings belonging to steps after Step S12 are made only if the clutch has been found to be in engagement position.

In Step S11, if the engaged clutch is monitored, the driving current value of the motor 7 is calculated by the same arithmetic operation as by the main CPU 1 (Step S12) and the difference between the calculated value of the driving current and the detected value of the driving current of the motor 7 is obtained (Step S13).

Judgment is made whether or not the difference is not more than a predetermined value (Step S14). If is judged not be more than the predetermined value, the main CPU 1 is considered as normally functioning, and high logic signals are applied to the first and second AND gates 51, 52 to allow the motor 7 to start (Step S15).

On the other hand, if the difference is judged to be more than the predetermined value, it is determined that there exists an abnormality in the operation of the main CPU 1, and then, low logic signals are applied to the first and second AND gates 51, 52, so that a fail-safe operation is made for prohibiting the driving of the motor 7 (Step S16), and the processing is returned to the main routine.

Figure 4:
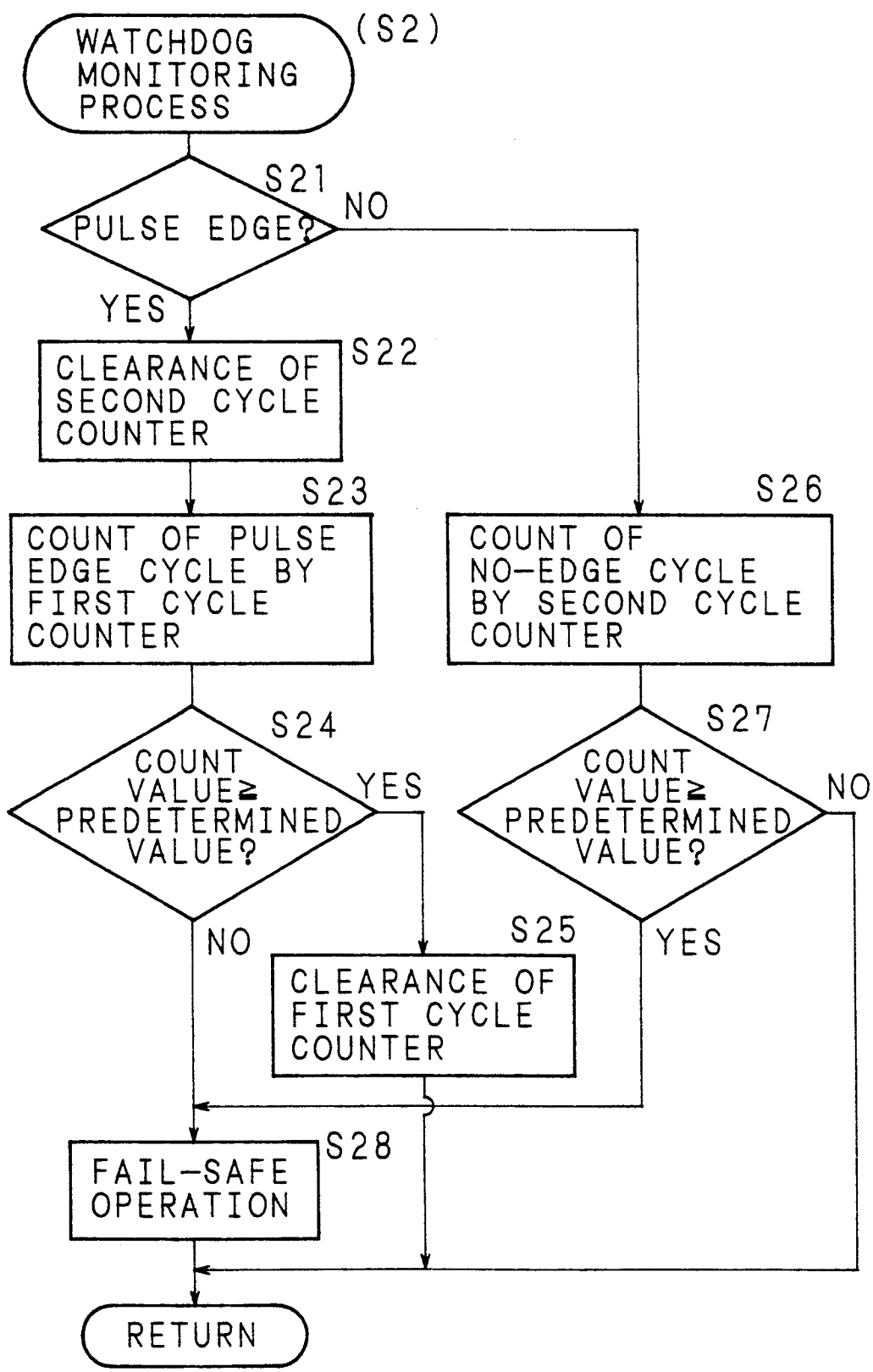
FIG. 4 is a flowchart showing a subroutine for a watchdog monitoring process in the sub CPU.

Next, description will be made of the watchdog monitoring process (Step S2) executed by the sub CPU 2 for the main CPU 1. FIG. 4 is a flowchart showing what has been processed by the watchdog monitoring process subroutine as executed by the sub CPU 2 (Step S2).

To begin with, judgement is made whether or not the edge (front or rear edge of a pulse) of the watchdog pulse signal from the main CPU 1 has come to appear (Step S21). If the appearance has been found, a value counted by a second cycle counter will be cleared (Step S22), followed by a counting made by a first cycle counter of the cycle of appearance of the edge of the watchdog pulse signal (Step S23).

Then, judgment is made whether or not the value counted by the first cycle counter is not less than a predetermined value (Step S24). If the counted value has been judged as not less than the predetermined value at Step S24, the frequency of the watchdog pulse signal means to be a proper value, so that the main CPU 1 with which the watchdog pulse signal has originated is considered as normal, thereby to clear the counted value fo the first cycle counter (Step S25) before returning.

On the other hand, if the counted value is judged as less than the predetermined value at Step S24, the frequency of the watchdog pulse signal means to be too high, so that the main CPU 1 with which the watchdog pulse signal has originated is considered as abnormal, and the processing advances to Step S28, where the fail-safe operation is executed as described afterwards.

If no edge of the watchdog pulse signal has been detected, a counting of the cycle of non-appearance of the edge of the watchdog pulse signal carried out by the second cycle counter (Step S26).

Then, judgment is made whether or not the counted value by the second cycle counter is not less than a predetermined value (Step S27). If the counted value is judged as less than the predetermined value at Step S27, the frequency of the watchdog pulse signal means to be a proper value, so that the main CPU 1 with which the watchdog pulse signal has originated is considered as normal before returning.

On the other hand, if the counted value is judged as not less than the predetermined value, the frequency of the watchdog pulse signal means to be too low, so that the main CPU 1 with which the watchdog pulse signal has originated is considered as abnormal, and the processing advances to Step S28.

At Step S28, low logic signals are applied to the first and second AND gates 51, 52 so as to prohibit the drive of the motor 7 for an execution of fail-safe operation before returning to the main routine.

Though the main CPU 1 similarly performs a watchdog monitoring process for the sub CPU 2, its processing contents are the same as those of sub CPU 2 as described above, of which further description will be omitted.

In the input/output monitoring control by the sub CPU 2 as aforementioned, the execution of the monitoring process is executed only on the basis of the judgment that the clutch 8 is in engagement position (steering assistance is in action), so that at the time when the motor lock is detected at the start of the main CPU 1, the operation of the main CPU 1 will never mistakenly detected by the sub CPU 2 as abnormal.

As above-described, in the electric power steering apparatus according to the present invention, execution by the second control unit (sub CPU 2) of detection of abnormality in the first control unit (main CPU 1) is limited to the driving control taking place for the steering assistance by the first control unit. Consequently, when the first control unit performs an initial diagnosis by actuating the motor independent from input of the detected torque and detected vehicle speed as a motor drive control apart from the motor drive control for the steering assistance, the second control unit never wrongly identifies the operation of the first control unit as abnormal. This will ensure detection by the second control unit of abnormality in the first dual controller system.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
   first control means for performing a drive control for steering assistance over a steering assistance motor for based on a detected steering torque and detected vehicle speed;
   second control means for detecting abnormality in said first control means by monitoring inputs and outputs to and from said first control means;
   detection means for detecting the state where the drive control for steering assistance is performed by said first control means; and
   means for controlling said second control means so as to detect abnormality in said first control means only when said detection means detects that the drive control for steering assistance is performed.

2. An electric power steering apparatus as defined in claim 1, further comprising a clutch for transmitting a driving force of the steering assistance motor, wherein said detection means is adapted to detect the state where the drive control for steering assistance is performed by said first control means by judging whether the clutch for transmitting a driving force of the steering assistance motor is in engagement or disengagement position.

3. An electric power steering apparatus as defined in claim 1, wherein said second control means compares a result of arithmetic operation for the drive control performed by said first control means over the steering assistance motor with a result of arithmetic operation for the drive control performed by said second control means over the steering assistance motor, thereby to detect abnormality in said first control means based on the compared result.

4. An electric power steering apparatus as defined in claim 3, wherein the results of arithmetic operation obtained by said first and second control means are driving current values for the steering assistance motor.

5. An electric power steering apparatus as defined in claim 1, wherein said second control means monitors the cycle of a watchdog pulse signal outputted by said first control means so as to detect abnormality in said first control means based on the monitored result.

6. An electric power steering apparatus, comprising:
   means for detecting a steering torque applied at a steering wheel;
   means for detecting of the speed of a vehicle;
   a motor for providing a steering assistance force;
   first control means for performing a drive control for steering assistance over said motor based on the detected steering torque and detected vehicle speed;
   second control means for detecting abnormality in said first control means by monitoring inputs and outputs to and from said first control means;
   detection means for detecting the state where the drive control for steering assistance is performed by said first control means; and
   means for controlling said second control means so as to detect abnormality in said first control means only when said detection means detects that the drive control for steering assistance is performed.

7. An electric power steering apparatus as defined in claim 6, further comprising a clutch for transmitting a driving force of said motor.

8. An electric power steering apparatus as defined in claim 7, wherein said detection means judges whether said clutch is in engagement or disengagement position, and detects that the drive control for steering assistance is performed by said first control means when the judgement is made that said clutch is in engagement position.

9. An electric power steering apparatus as defined in claim 8, wherein said detection means judges whether said clutch is in engagement or disengagement position based on a terminal voltage value or driving current value of said clutch.

* * * * *